(12) United States Patent
Langelier et al.

(10) Patent No.: US 10,120,402 B2
(45) Date of Patent: Nov. 6, 2018

(54) LARGE SCALE SUB-SEA HIGH VOLTAGE DISTRIBUTED DC POWER INFRASTRUCTURE USING SERIES ADAPTIVE CLAMPING

(71) Applicant: Raytheon Company, Waltham, MA (US)

(72) Inventors: Mark S. Langelier, Harrisville, RI (US); Boris S. Jacobson, Westford, MA (US); George E. Anderson, Barrington, RI (US); Michael F. Janik, Portsmouth, RI (US)

(73) Assignee: Raytheon Company, Waltham, MA (US)

( * ) Notice: Subject to any disclaimer, the term of this patent is extended or adjusted under 35 U.S.C. 154(b) by 190 days.

(21) Appl. No.: 15/182,574

(22) Filed: Jun. 14, 2016

(65) Prior Publication Data

US 2017/0357281 A1    Dec. 14, 2017

(51) Int. Cl.
| | | |
|---|---|---|
| *G05F 1/10* | (2006.01) | |
| *G05F 1/66* | (2006.01) | |
| *H02J 1/04* | (2006.01) | |

(52) U.S. Cl.
CPC ............... *G05F 1/66* (2013.01); *G05F 1/10* (2013.01); *H02J 1/04* (2013.01)

(58) Field of Classification Search
None
See application file for complete search history.

(56) References Cited

U.S. PATENT DOCUMENTS

| | | |
|---|---|---|
| 8,692,408 B2 | 4/2014 | Zhang et al. |
| 2009/0226262 A1 | 9/2009 | Karstad et al. |
| 2010/0019930 A1 | 1/2010 | Biester et al. |
| 2012/0144828 A1* | 6/2012 | Lazaris ............... H02J 3/383 60/641.1 |
| 2012/0150679 A1* | 6/2012 | Lazaris ............ G06Q 30/0605 705/26.2 |
| 2012/0267955 A1 | 10/2012 | Zhan et al. |
| 2013/0026831 A1 | 1/2013 | Sihler et al. |
| 2013/0181532 A1* | 7/2013 | Kj R ...................... H02M 1/34 307/82 |
| 2014/0098468 A1 | 4/2014 | Boe |
| 2015/0184658 A1 | 7/2015 | Sihler et al. |

\* cited by examiner

*Primary Examiner* — Jared Fureman
*Assistant Examiner* — Aqeel Bukhari (57) ABSTRACT

A system includes at least one pair of series adaptive clamps (SACs). Each SAC is configured to connect to a single conductor that is configured to conduct a constant current between shore-side power sources on opposite ends of the single conductor. Each SAC is configured to clamp a specified amount of power from the single conductor. Each SAC is configured to connect to one end of two ends of a power transfer bus, wherein the other end of the power transfer bus is connected to another SAC of a same pair of SACs. Each SAC is configured to provide a constant voltage to the power transfer bus at the constant current in order to supply at least some of the specified amount of power to a load connected to the power transfer bus.

20 Claims, 8 Drawing Sheets

LARGE SCALE SUB-SEA HIGH VOLTAGE DISTRIBUTED DC POWER INFRASTRUCTURE USING SERIES ADAPTIVE CLAMPING

TECHNICAL FIELD

This disclosure is generally directed to sub-sea large scale high voltage power system (LSHVPS) infrastructure. More specifically, this disclosure is directed to an apparatus and method for large scale sub-sea high voltage distributed direct current (DC) power infrastructure using series adaptive clamping.

BACKGROUND

Current sub-sea LSHVPS topologies provide limited connectivity and limited functionality, and require use of multi-conductor complex cabling that is monetarily expensive. A typical LSHVPS underwater power system topology includes a dedicated parallel source to load connectivity, which is unidirectional. That is, the typical LSHVPS underwater power system topology provides parallel multi-conductor connectivity via alternating current (AC) or DC sources to a limited number of sea-side power nodes. The sea-side power nodes (for example, sub-sea power nodes) typically provide unidirectional power distribution, conversion, and connectivity to loads that are connected to the sea-side power node.

As an example of a current sub-sea LSHVPS topology, AC primary feeds are used to distribute or rectify power to DC branches via a switch matrix. Shore-side DC-to-AC feeds are used to supply power to sub-sea power nodes for application specific loads such as power generators for branches or compressor boosters for branches.

As another example of a current sub-sea LSHVPS topology, there is a DC-to-DC conversion topology, which is application specific for a limited number of sea-side power nodes using parallel feed topology to branches. A sea-side power node creates or otherwise corresponds to a branch.

As another example of a current sub-sea LSHVPS topology, there is a DC series power feed constant current node to node topology, which is application specific for low power and limited distribution applications. In sum, current sub-sea LSHVPS topologies are not targeted for large scale area coverage, scalability, connectivity, and design for low cost deployment and installation.

SUMMARY

This disclosure provides a system and method for large scale sub-sea high voltage distributed DC power infrastructure using series adaptive clamping.

In a first example, a method includes clamping, by a series adaptive clamp, a specified amount of power from a single conductor that is configured to conduct a constant current between shore-side power sources on opposite ends of the single conductor. The method also includes providing, by the series adaptive clamp, a constant voltage to a power transfer bus at the constant current in order to supply at least some of the specified amount of power to a load connected to the power transfer bus. The power transfer bus has two ends, and the two ends include a first end connected to the series adaptive clamp and a second end connected to another series adaptive clamp.

In a second example, an apparatus includes a series adaptive clamp configured to connect to a single conductor that is configured to conduct a constant current between shore-side power sources on opposite ends of the single conductor. The series adaptive clamp is configured to clamp a specified amount of power from the single conductor. The series adaptive clamp is configured to connect to one end of two ends of a power transfer bus, wherein the other end of the power transfer bus is connected to another series adaptive clamp. The series adaptive clamp is configured to provide a constant voltage to the power transfer bus at the constant current in order to supply at least some of the specified amount of power to a load connected to the power transfer bus.

In a third example, a system includes at least one pair of series adaptive clamps (SACs). Each SAC is configured to connect to a single conductor that is configured to conduct a constant current between shore-side power sources on opposite ends of the single conductor. Each SAC is configured to clamp a specified amount of power from the single conductor. Each SAC is configured to connect to one end of two ends of a power transfer bus, wherein the other end of the power transfer bus is connected to another SAC of a same pair of SACs. Each SAC is configured to provide a constant voltage to the power transfer bus at the constant current in order to supply at least some of the specified amount of power to a load connected to the power transfer bus.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 7, discussed below, and the various examples used to describe the principles of the present invention in this patent document are by way of illustration only and should not be construed in any way to limit the scope of the invention. Those skilled in the art will understand that the principles of the present invention may be implemented in any suitable manner and in any type of suitably arranged device or system.

The embodiments of this disclosure provide solutions to a need for a sub-sea power delivery and distribution architecture that is designed for modularity and scalability for large scale distributed power systems, such as an intelligent power and energy management (IPEM) architecture.

Figure 1:
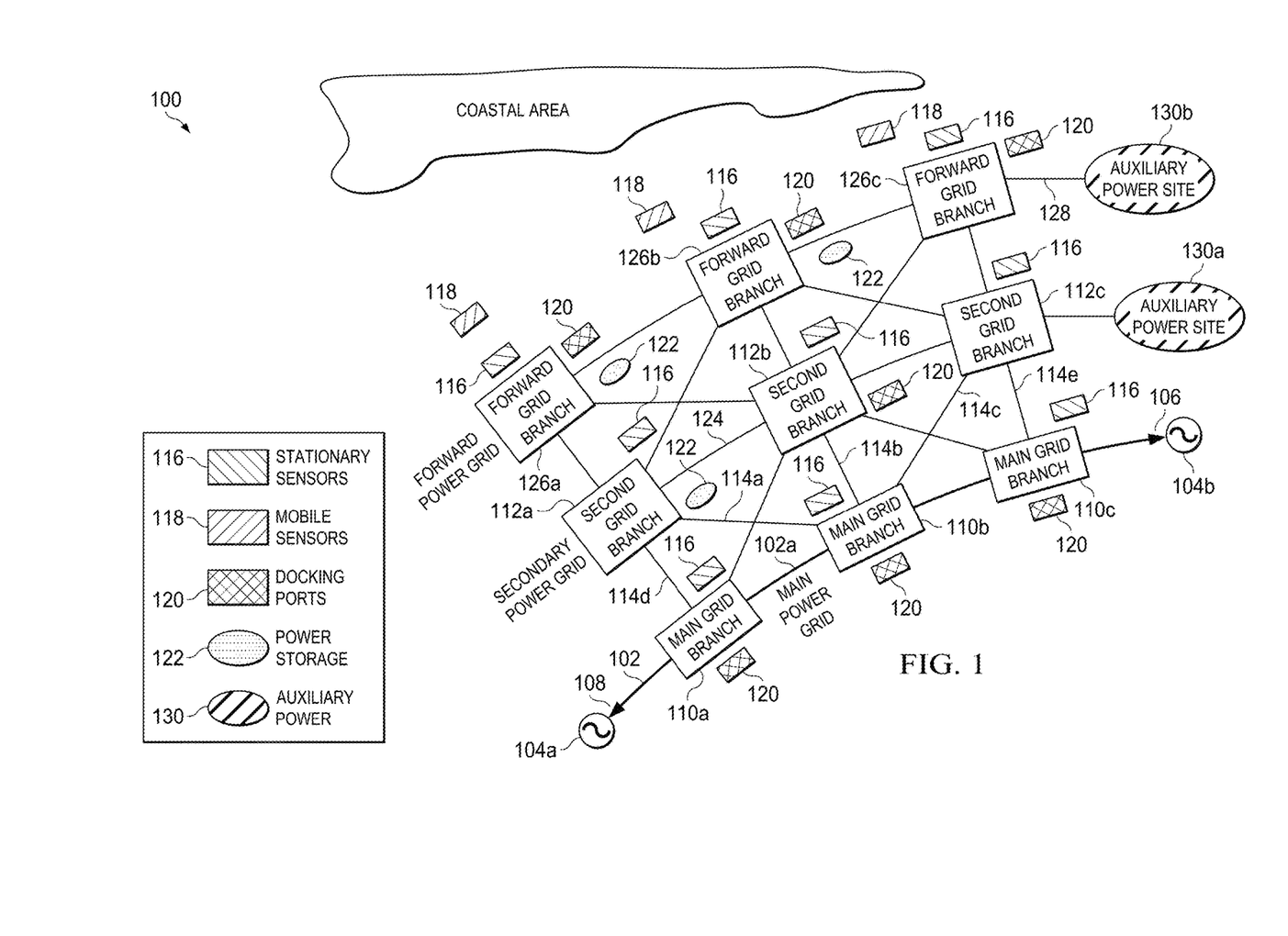
FIG. 1 illustrates an example mesh power grid for large scale sub-sea high voltage distributed direct current (DC) power infrastructure using series adaptive clamping in accordance with this disclosure.

FIG. 1 illustrates an example mesh power grid 100 for large scale sub-sea high voltage distributed direct current (DC) power infrastructure using series adaptive clamping in accordance with this disclosure. The mesh power grid 100 provides a transmission and distribution grid for delivering electric power to a load located at sea. The load can include various devices that demand different amounts of power. Accordingly, the mesh power grid 100 is a multi-tier power grid, wherein each power grid tier has a different operating limit. In the example shown, a high power tier of the mesh power grid 100 includes a main power grid having an operating range of less than forty kilowatts (<40 kW) per power branching unit (PBU) 110; a medium power tier of the mesh power grid 100 includes a secondary power grid having an operating range of less than fifteen kilowatts (<15 kW) per power branching unit (PBU) 112; and a low power tier of the mesh power grid 100 includes a forward power grid having an operating range of less than five kilowatts (<5 kW) per power branching unit (PBU) 126. The main power grid is deployed furthest from the area of coverage, provides power to the secondary and forward power grids. That is, the forward power grid is a load of the secondary supply grid; and the secondary supply grid is a load of the main power grid. The secondary and forward power grids act as smaller "substations" which will allow for direct power conversion fed from the main supply grid.

The mesh power grid 100 includes a single conductor 102. The single conductor 102 conducts a constant current (CC) bi-directionally between a single CC power source with sea water return or between multiple shore-side power sources 104a-104b connected at opposite ends of the single conductor 102. When the single conductor 102 conducts the CC in a first direction 106, the second shore-side source 104b or second sea water return provides a return path for the power generated by and output from the first shore-side source 104a. At other times, when the single conductor 102 conducts the CC in an opposite, second direction 108, the first shore-side source 104a or first sea water return provides a return path for the power generated by and output from the second shore-side source 104b. The single conductor 102 conducts direct current (DC). The examples described in this disclosure will be described for the case in which the single conductor 102 conducts the CC as DC.

As an example, the multiple shore-side power sources could include a first shore-side source 104a thousands of kilometers from a second shore-side source 104b. In the example shown, the first and second shore-side sources 104a-104b generate DC electricity.

The mesh power grid 100 includes a number N of power branching units (PBU). Each of the N PBUs supports multiple branch ports to provide universal bi-direction sink/source connectivity to various sensors, vehicles, and alternate energy sources. Each of the N PBUs also provides power fault detection and automatic power re-routing using alternate power sources. To provide these capabilities, each of the N PBUs is either directly or indirectly coupled to the single conductor 102, and includes at least one port (described in detail with respect to FIG. 4) for connecting to an external device, such as PBU of a different tier. In order to perform the automatic power re-routing using alternate power sources, each of the N PBUs includes at least one series adaptive clamp 404 (described in detail with respect to FIG. 4) that connects and disconnects the PBU in series to the single conductor 102, and that switches terminals of the series connection between a ground electrode and a corresponding one of the shore-side power sources 104a-104b.

Referring to the main power grid of the high power tier, each of the PBUs 110a-110c ("Main Grid Branch") of the main power grid is directly coupled to the single conductor 102 via a respective series connection. Also, each of the PBUs 110a-110c of the main power grid includes at least one port connected to a respective one of the PBUs 112a-112c ("Second Grid Branch") of the secondary power grid via a respective parallel connection. The bi-directional series with seawater return or parallel connection of a PBU 112a to a PBU 110a indirectly couples the PBU 112a of the secondary power grid to the single conductor 102 through the PBU 112a. In the example shown, the PBU 110b includes multiple ports (for example, mesh grid power ports) connected to three PBUs 112a-112c of the secondary power grid via respective parallel connections 114a-114c. Additionally, the PBU 110b includes multiple ports that can connect to a local load or local auxiliary power sources. Examples of local load include stationary sensors 116, mobile sensors 118, or docking ports 120. Examples of local auxiliary power sources include batteries, or other power storage 122.

Note that the secondary and forward power grids of lower tiers can operate in a similar manner as the main power grid of the high power tier, and can include components that are the same as or similar to the components of the main power grid of the high power tier. For example, similar to the indirect coupling of the secondary power grid components to the single conductor 102, the PBUs 112a-112c of the secondary power grid directly couple to another single conductor 124 at respective series connections and include ports connected to the PBUs 126a-126c ("Fwd. Grid Branch") of the forward power grid via respective parallel connections. For purposes of distinction, the single conductor 102 is also referred to as a "trunk line." For example, similar to the DC CC that the trunk line 102 conducts between the multiple shore-side power sources 104a-104b, the other single conductors 124 and 128 conduct DC CC between the serially connected PBUs 112a-112c and the serially connected PBUs 126a-126c, respectively.

As described more particularly below with reference to FIG. 5, the N PBUs 110a-110c, 112a-112c, and 126a-126c perform power fault detection and automatic power re-routing using alternate power sources. That is, a PBU detects when the first shore-side source 104a has a fault or otherwise disconnects from providing power flow to the trunk line 102 in the direction 106. In response, the PBU can automatically (without human intervention) switch the return path to ground (i.e., sea ground). This enables the mesh power grid 100 to continue receiving power from the uninterrupted second shore-side source 104 by re-routing the power flow to another direction 108. The PBU performs a similar re-routing upon detection of a fault at the second shore-side source 104b.

When the mesh power grid 100 is connected to and receiving power from the multiple shore-side power sources 104a-104b, a PBU can detect a fault on a midsection 102a of the trunk line 102. More particularly, the serial connection of the PBU to the trunk line 102 includes a first clamping series connection on the same side of the PBU as the first shore-side source 104a, and a second clamping series connection on the same side of the PBU as the second shore-side source 104b. In response to the detection of the fault on the midsection 102a, the PBU 110a can disconnect its second clamping series connection from the midsection 102a, and the PBU 110b can disconnect its first clamping series connection from the midsection 102a. These disconnections enable the mesh power grid 100 to electrically isolate the fault interrupted midsection 102a without disconnecting from any of the shore-side power sources 104a-104b. These disconnections correspond to operations of switching the return paths to ground. That is, the second clamping series connection of the PBU 110a provides a return path for the power received from the first shore-side source 104a in the first direction 106; and the first clamping series connection of the PBU 110b provides a return path for the power received from the second shore-side source 104b in the second direction 108.

When the mesh power grid 100 is disconnected or otherwise not receiving power from the multiple shore-side power sources 104a-104b, the mesh power grid 100 can connect one or more auxiliary sources of auxiliary power sites 130a-130b (generally reference number 130) via respective series connections to the other single conductors 124 and 128. In this case, the other single conductor 124 conducts CC in the second direction 108, and the ground provides a return path for the power generated by and output from the auxiliary power site 130a. Similarly, the other single conductor 128 conducts CC in the second direction 108, and the ground provides a return path for the power generated by and output from the auxiliary power site 130b.

Although FIG. 1 illustrates one example mesh power grid 100, various changes may be made to FIG. 1. For example, the number of main PBUs clamped to the trunk line 102 could be greater than three, such as any suitable amount that can be served by the various sources connected to the mesh power grid.

Figure 2:
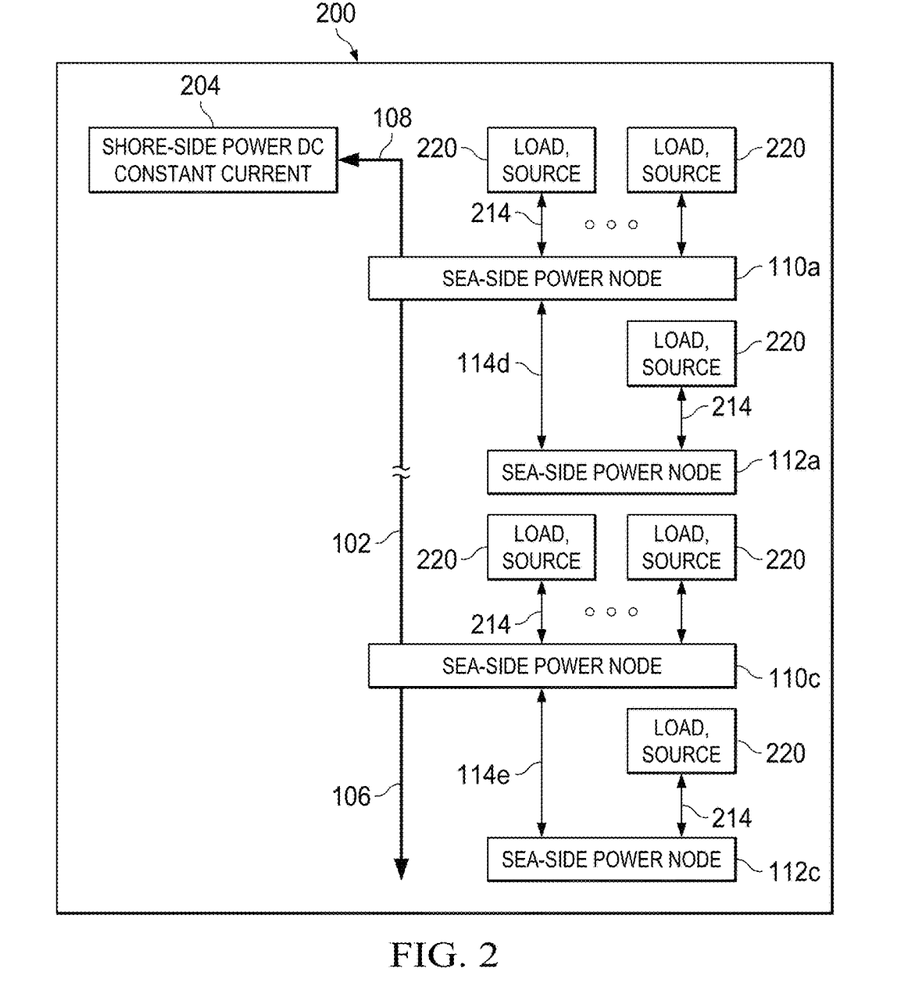
FIG. 2 illustrates an example sub-sea large scale high voltage power system (LSHVPS) infrastructure including constant current (CC) DC bidirectional series adaptive clamping in accordance with this disclosure.

FIG. 2 illustrates an example sub-sea large scale high voltage power system (LSHVPS) infrastructure 200 including constant current DC bidirectional series adaptive clamping in accordance with this disclosure. Note that the LSHVPS infrastructure 200 can be the same as or similar to the main power grid of the high power tier of the mesh power grid 100. Features of the main power grid of the mesh power grid 100 could be used in the LSHVPS infrastructure 200. The LSHVPS infrastructure 200 could include the components of the main power grid of the mesh power grid 100 shown in FIG. 1 and could operate in a same or similar manner. For instance, the LSHVPS infrastructure 200 could receive shore-side power DC CC 204 from a shore-side source 104a or 104b, and could include the trunk line 102 that conducts DC CC in a first direction 106 between multiple shore-side sources 104a-104b or in a second direction 108, the main PBUs 110a-110c that provide power to the secondary power grid through parallel connections 114d and 114e with lower-operating-limit PBUs 112a and 112c of the mesh power grid 100. For simplicity of explanation, descriptions of the features 102, 106, 108, 110a-110c, 112a-112c, and 114d-114e will not be duplicated with reference to FIG. 2.

As shown in FIG. 2, external devices 220 are connected to the ports of the main PBUs 110a-110c and ports of the lower-operating-limit PBUs 112a-112c. The external device 220 could be a load (such as a stationary sensor 116 or mobile sensor 118) that draws power from the PBU via the bi-directional connections 214 or a source (such as power storage 122) that provides power to the PBU via the bi-directional connections 214. Note that the bi-directional connection 214 to the port of a PBU could the same as or similar to the parallel connections 114a-114e of FIG. 1. The port includes a bidirectional power interface that supports constant voltage (CV) and CC at distribution branches.

Each PBU 110a-110c, 112a-112c provides bidirectional series adaptive power clamping and also supports bidirectional power adaption for connecting to loads or sources, which enables the LSHVPS infrastructure 200 to provide scalability according to the magnitude of power dynamically demanded and to provide modularity according to the quantity of external devices connected to multiple ports of the PBUs. That is, the series adaptive clamp 404 (described in detail with respect to FIG. 4) uses adaptively-controlled active voltage clamping for each PBU. The series adaptive clamp 404 implements compact power conversion technology (CPCT) and bidirectional power conversion to convert power between series and parallel connections, which enables each port to support constant voltage (CV) and CC at distribution branches.

Figure 3:
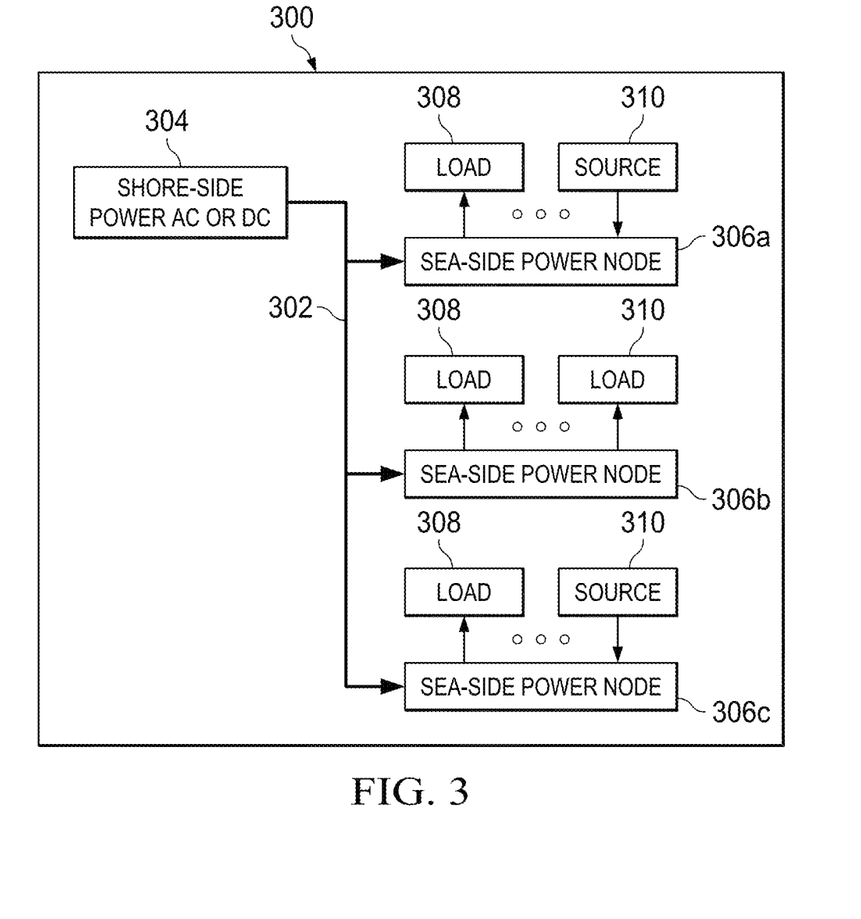
FIG. 3 illustrates a typical LSHVPS underwater power system topology including dedicated parallel source to load connectivity.

FIG. 3 illustrates a typical LSHVPS underwater power system 300 topology including dedicated parallel source to load connectivity. The power system 300 includes parallel multi-conductor cabling 302, which is complex and expensive. The multi-conductor cabling 302 provides unidirectional power distribution from a shore-side power source 304. The shore-side power source 304 could be an AC or DC source. That is, the power system 300 provides parallel multi-conductor connectivity via AC or DC sources to a limited number of sea-side power nodes 306a-306c. The sea-side power nodes 306a-306c provide unidirectional power distribution, conversion and parallel connectivity to loads 308. The sea-side power nodes 306a-306c provide unidirectional power reception, conversion and parallel connectivity to sources 310.

Figure 4:
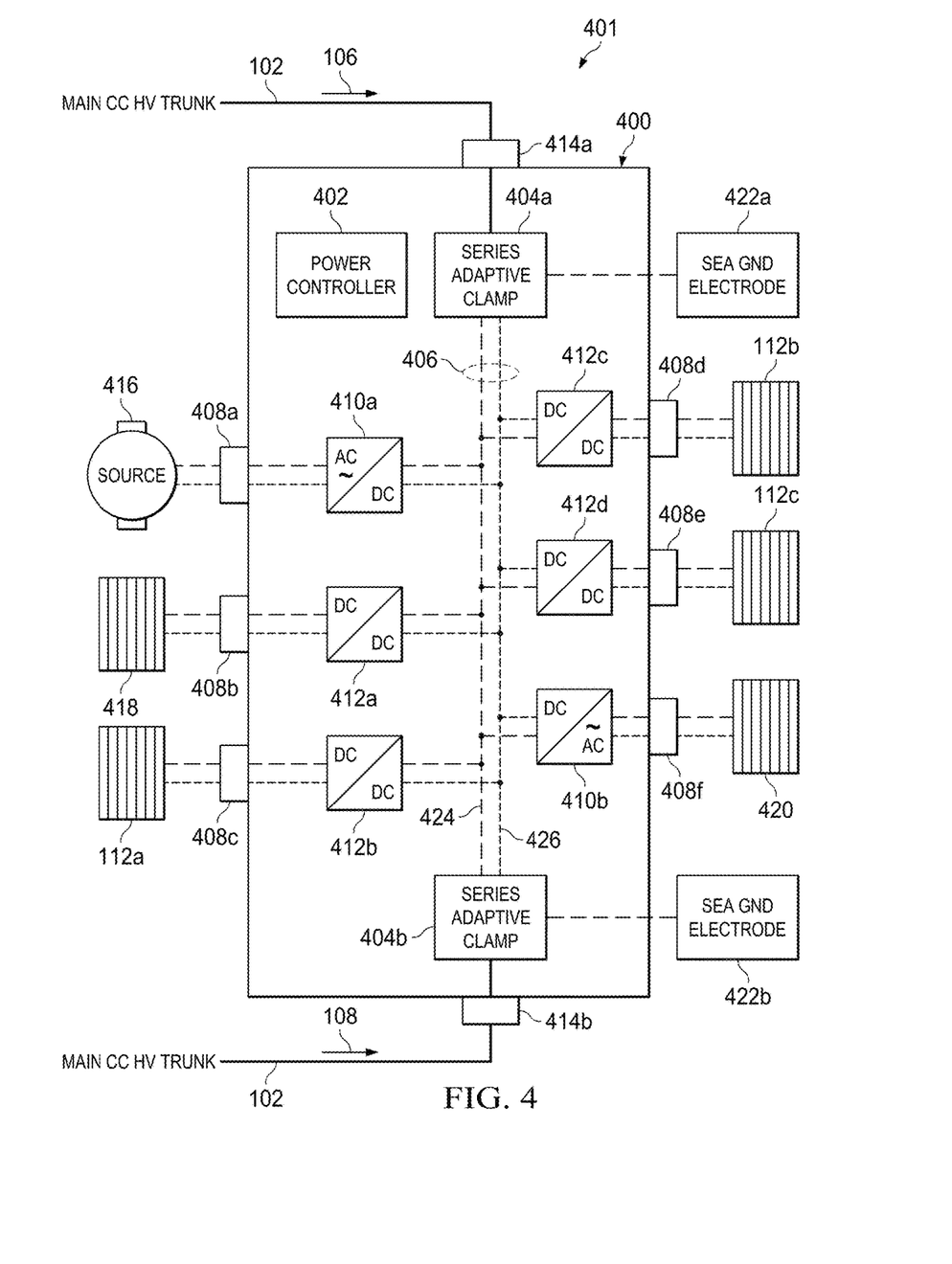
FIG. 4 illustrates an example power branching unit of a main supply grid in accordance with this disclosure.

FIG. 4 illustrates an example power branching unit 400 of a main power grid 401 in accordance with this disclosure. Note that the PBU 400 can be the same as or similar to the main PBUs 110a-110c of FIG. 1 that provide power to the secondary power grid through parallel connections 114a-114e with lower-operating-limit PBUs 112a-112c of the mesh power grid 100. Features of the main power grid of the mesh power grid 100 of FIG. 1 could be used in the main power grid 401, and the main power grid 401 could include the components of the main power grid of the mesh power grid 100 shown in FIG. 1 and could operate in a same or similar manner. Also, features of the LSHVPS infrastructure 200 of FIG. 2 could be used in the main power grid 401, and the main power grid 401 could include the components of the LSHVPS infrastructure 200 shown in FIG. 2 and could operate in a same or similar manner. For instance, the main power grid 401 could receive shore-side power DC CC 204 from a shore-side source 104a or 104b, and could include the main constant current high voltage trunk line 102 that conducts DC CC in a first direction 106 between multiple shore-side sources 104a-104b or in a second direction 108. For simplicity of explanation, descriptions of the features common to the main power grid of the mesh power grid 100 will not be duplicated with reference to FIG. 4.

The PBU 400 includes a power controller 402, a group of series adaptive clamps 404a-404b corresponding to first and second clamping series connections on opposite sides of the PBU, a constant voltage local regulated power transfer bus 406, a set of ports 408a-408f, and a power converter 410a-410b and 412a-412d per port. As an example, the group of series adaptive claims 404a-404b can include multiple of series adaptive claims, such as a pair or more than two. For simplicity, together, the pair of series adaptive clamps 404a-404b are referred to as the series adaptive clamp 404. In certain embodiments, the PBU 400 is connected to a first disconnect switch 414a that connects or disconnects the PBU 400 from the first shore-side source 104a and is connected to a second disconnect switch 414b that connects or disconnects the PBU 400 from the second shore-side source 104b. In other embodiments, the PBU 400 includes the first and second disconnect switches 414a-414b.

The power controller 402 includes executable instructions stored in a machine-usable, computer-usable, or computer-readable medium in any of a variety of forms, wherein the instructions, when executed, cause the processing circuitry to perform series adaptive clamping implemented by large scale sub-sea high voltage distributed direct current (DC) power infrastructure in accordance with this disclosure (described in detail with reference to FIG. 5). The power controller 402 could, for instance, include at least one processor, microprocessor, microcontroller, field programmable gate array (FPGA), application specific integrated circuit (ASIC), or other processing or control device. The power controller 402 controls the operations of other components 404a-404b, 408a-408f, 410a-410b, 412a-412d, 414a-414b of the PBU 400; and can be configured to control the operations of external devices 416, 418, 112a-112c, 420 connected to the PBU 400.

The power controller 402 enables the PBU 400 to avoid power losses due to heat by adjusting the specified amount of power sunk at the PBU 400. As a specific example, a change of load connected to the power transfer bus 406 can include serving 800 watts of demanded load (for example, operating DC sensor load 418) on one day, and then serving 1100 watts of demanded load (for example, additionally operating AC sensor load 420) on the next day. In this specific example, the power controller 402 controls the SAC 404 to clamp 800 watts on the one day, and then to adjust to clamp 1100 watts on the next day.

The SAC 404 operates analogously to a Zener diode connected in series to the trunk line 102, wherein the pair of SACs 404a-404b analogously serve as the cathode and anode of the Zener diode. The trunk line 102, namely the "hot" line of the circuit, generally carries negative voltage potential due to cathodic/anodic effects relative to the sea water that provides anodic ground potential. In this analogy, the cathode and anode of the Zener diode are respectively connected to both parallel paths 424-426 at the two opposite ends of the power transfer bus 406. The SAC 404 enables the path 424 of the power transfer bus 406 to connect to the sea ground electrode 422a-422b.

Figure 7A:
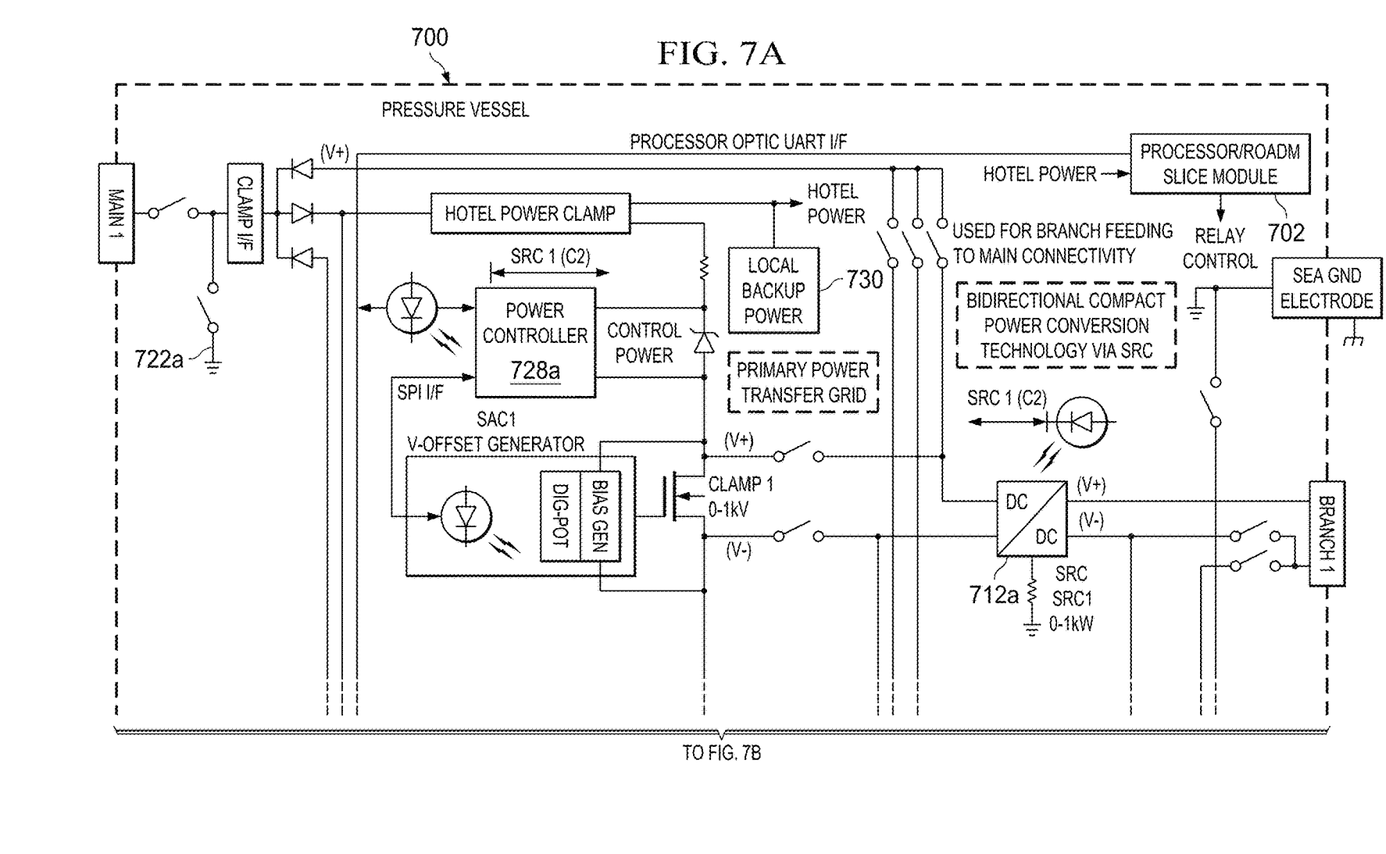
FIGS. 7A and 7B (collectively "FIG. 7") illustrate a schematic of an example power branching unit for a common power transfer grid in accordance with this disclosure.

The SAC 404a is configured to form a first series connection to the trunk line 102, to form a parallel connection to the power transfer bus 406 at a first end of the power transfer bus 406, and to connect to the sea ground electrode 422a in series. More particularly, based on the source of power received by the PBU 400, the SAC 404a is configured to switch the return path to either the sea ground electrode 422a or the second shore-side source 104b. The SAC 404a operates in response to control signals from the power controller 402 and in cooperation with the SAC 404b. That is, the SAC 404a clamps a specified amount of power from the trunk line 102 by forming a first series connection to the trunk line 102. The SAC 404a could work in conjunction with the SAC 404b to clamp the first and second series connections at substantially the same time. The SAC 404a converts the specified amount of power from the series connectivity at the trunk line 102 to the parallel connectivity at the first end of the power transfer bus 406. The SAC 404a includes a backup power source (reference number 730 of FIG. 7) that enables the SAC 404a to continue operating for a limited period of time without supply from any shore-side source 104a-104b or auxiliary source 416.

The SAC 404b operates in an analogous manner as the SAC 404a, namely, with respect to the second serial connection of the PBU 400, the second disconnect switch 414b, the second end of the power transfer bus 406, and the operation of switching the return path between the sea ground electrode 422b and second shore-side source 104b. For simplicity of explanation, descriptions of the features of the SAC 404b analogous to or common with the SAC 404a will not be duplicated.

In the example shown, the constant voltage local regulated power transfer bus 406 carries direct current. Accordingly, the set of power converters 410a-b and 412a-412d convert from the DC voltage of the power transfer bus 406 to the voltage requirements of the external devices connected to the power transfer bus 406 via the set of ports. Also, the external devices demanding power from or supplying power to the power transfer bus 406 can change quantity from time to time or vary dynamically in terms of magnitude. That is, the power transfer bus 406 can conduct various amounts of power within an operating range. As an example, the operating range could be one-hundred watts (100 W) to one thousand watts (1 kW). This operating range corresponds to a power transfer bus 406 receiving, from the pair of clamps 404a-404b, one hundred to one thousand volts (100V-1 kV) at one ampere (A) constant current. The power transfer bus 406 includes an adaptable switched voltage topology.

In the example shown, the PBU 400 includes a set of eight (8) ports 408a-408f. The port 408a is connected to an AC auxiliary source 416; and the corresponding power converter 410a is a DC-to-AC converter. The port 408b is connected to a DC sensor load 418, which could be a mobile sensor 118 or a stationary sensor 116. The power converter 412a corresponding to the port 408b is a DC-to-DC converter. The ports 408c-408e are mesh grid power ports that are configured to connect to respective lower-operating-limit PBUs 112a-112c, which can act as a load or source for the PBU 400. The power converters 412b-412d corresponding to the ports 408c-408e are DC-to-DC converters. The port 408f is connected to an AC sensor load 420, which could be a mobile sensor 118 or a stationary sensor 116. The power converter 410b corresponding to the port 408f is a DC-to-AC converter.

Although FIG. 4 illustrates one example power branching unit 400, various changes may be made to FIG. 4. For example, the PBU 400 could have a different operating range because the limiting factor is the withstanding breakdown voltage to sea water voltage (i.e., ground), which drives the physical size of the PBU 400 and affects the scalable series connectivity and main current feed.

Figure 5:
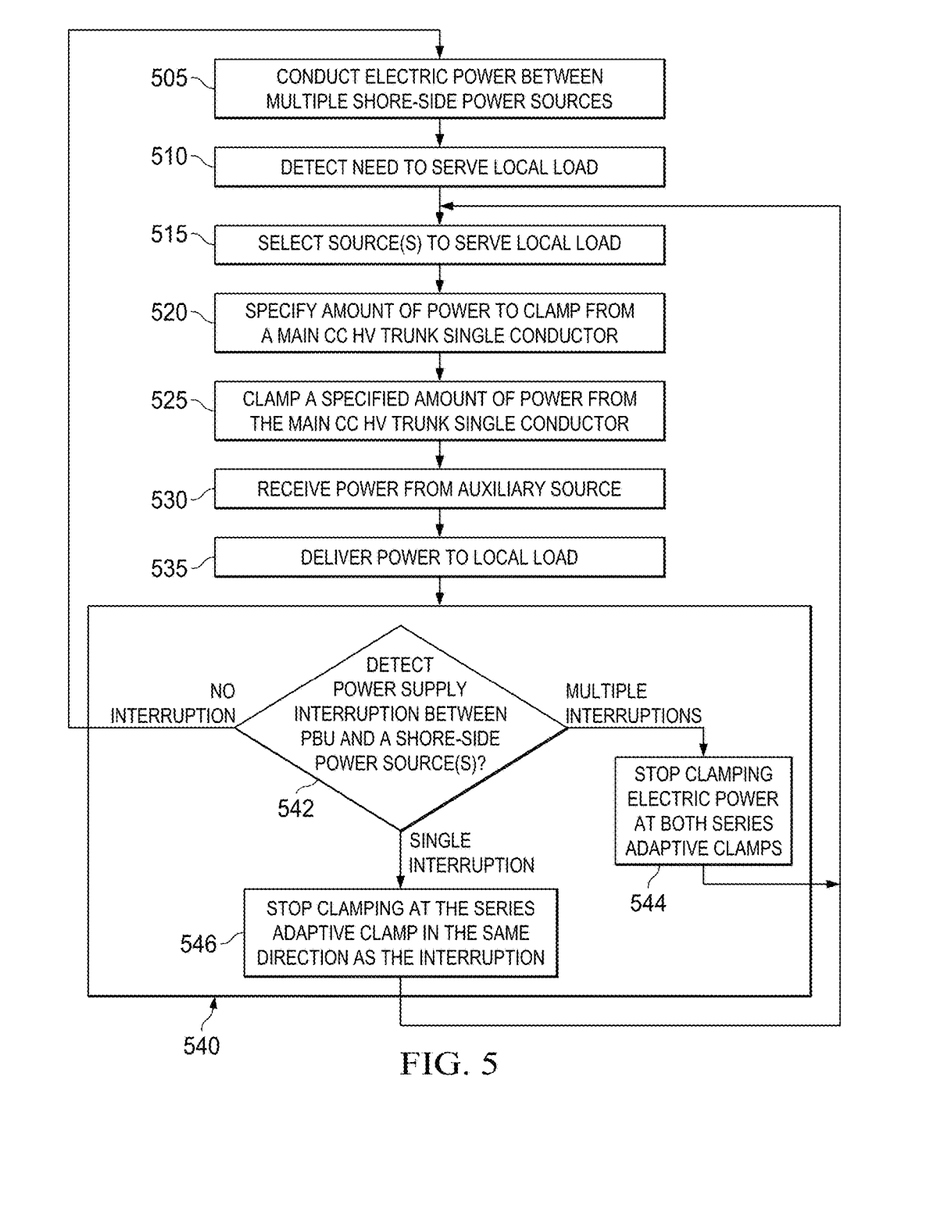
FIG. 5 illustrates an example method for series adaptive clamping implemented by large scale sub-sea high voltage distributed direct current (DC) power infrastructure in accordance with this disclosure.

FIG. 5 illustrates an example method 500 for series adaptive clamping implemented by large scale sub-sea high voltage distributed direct current (DC) power infrastructure in accordance with this disclosure. For simplicity, the method 500 will be described as though implemented by the power branching unit 400 of FIG. 4. It is understood that the method 500 could be implemented by any suitable device including the series adaptive clamping in accordance with this disclosure.

In block 505, the PBU 400 conducts electric power between multiple shore-side power sources. That is, the PBU 400 conducts power between two terminals of the trunk line 102, including a first terminal (e.g., first serial connection at the SAC 404a) that electrically couples the PBU 400 to a first shore-side source 104a via the trunk line 102, and including a second terminal (e.g., second serial connection at the SAC 404b) that electrically couples the PBU 400 to a second shore-side source 104b via the trunk line 102. For ease of explanation, the first and second terminals (e.g., at SAC 404a and SAC 404b) are referred to as being on opposite sides of the PBU 400 as shown in FIG. 4, but this disclosure includes any suitable physical location of the terminals.

In block 510, the PBU 400 detects a need to serve a local load. For example, the power controller 402 analyzes signals and determines that a demand for power exists at a load connected to a port of the PBU, such as the mesh grid power port 408c, 408d, 408e. The power controller 402 can monitor the set of ports 408a-408f of the PBU 400 for changes of the load, which can include an increase or decrease of the detected demand for power, which may affect block 520 by causing the power controller 402 to adjust the specified amount of power to clamp according to the change of the load (i.e., the detected demand for power).

In block 515, the PBU 400 selects source(s) to serve the local load. That is, the PBU 400 determines whether the amount of power demanded to operate the load is met by: (i) the multiple shore-side power sources; (ii) a subset of the multiple shore-side power sources; (iii) the subset of the multiple shore-side power sources together with the auxiliary source 416 connected to a port of the PBU; or (iv) the auxiliary source 416. The power controller 402 can be configured to make this determination and to select the source(s) according to the determination.

Selecting source(s) to serve the local load can additionally be based on the availability status of sources monitored by the PBU 400. That is, the power controller 402 monitors the available/unavailable status of the various sources 416 and 104a-102b, and refrains from selecting unavailable sources to serve the local load, or otherwise only selects from the available sources.

In block 520, the PBU 400 determines a specified amount of power to clamp from the trunk line 102. When the PBU 400 selects to meet the demanded power without any shore-side power sources, namely, by selecting the auxiliary source 416, the PBU 400 determines zero watts as the specified amount of power to clamp.

In block 525, the SACs 404a-404b clamp the specified amount of power from the trunk line 102. For example, the power controller 402 controls the SACs 404a-404b to clamp the specified amount of power from the trunk line 102. By clamping the specified amount of power from the trunk line 102, the PBU 400 receives the specified amount of power from the shore-side power source(s) and other sources in electrical communication with the PBU 400 via the trunk line 102. In performance of clamping power from the trunk line 102, the SACs 404a-404b perform a connectivity conversion between the series connection at the trunk line 102 and the parallel connection at the power transfer bus 406.

In block 530, the PBU 400 receives power from the auxiliary source 416 according to the selection of block 515. When the PBU 400 selects to meet the demanded power without any auxiliary sources, namely, by selecting (i) the multiple shore-side power sources or selecting (ii) a subset of the multiple shore-side power sources, the PBU 400 determines receive zero watts from the auxiliary source 416.

In block 535, the PBU 400 delivers power to the local load (namely, external devices 418, 112a-112c, 420 drawing power from the PBU 400) for which the existence of the demand for power was detected. That is, the demanding local load receives power from the selected source (s) through the PBU 400.

In block 540, the PBU 400 monitors the available/unavailable status of the various sources 416 and 104a-102b from which the PBU 400 could receive electric power. That is, the PBU 400 monitors for a fault or disconnection along the trunk line 102 between the PBU 400 and the first shore-side source, a fault or disconnection along the trunk line 102 between the PBU 400 and the second shore-side source, and a disconnection of the first shore-side source or of the second shore-side source. In certain embodiments, the PBU 400 additionally monitors for a disconnection of the auxiliary source. Block 540 includes blocks 542-546.

In block 542, the power controller 402 detects an interruption (e.g., fault or disconnection) of power supply between the PBU 400 and one or more shore-side power sources. For example, the power controller 402 can detect that the terminals (e.g., at SAC 404a and SAC 404b) on both sides of the PBU 400 are disconnected from the trunk line 102 or otherwise not receiving power from the shore-side power sources 104a-104b, which are cases of multiple interruptions. As another example, the power controller 402 can detect that the first terminal (e.g., first serial connection at the SAC 404a) is disconnected from the trunk line 102 or otherwise not receiving power from the first shore-side source 104a, alternatively the power controller 402 can detect that the second terminal (e.g., second serial connection at the SAC 404b) is disconnected from the trunk line 102 or otherwise not receiving power from the second shore-side source 104b, each of which is a single interruption case. In sum, the method 500 returns to block 505 when no interruption is detected; proceeds to block 544 when multiple interruptions are detected; and proceeds to block 546 when a single interruption is detected.

In block 544, in response to detecting a power supply interruption from on both sides of the PBU, the power controller 402 controls both SACs 404a-404b to stop clamping. The process 500 proceeds to block 515 to select a source(s) to meet the demanded power of the local load, in this case, based on the unavailability status of the shore-side power source or the unavailability status of the trunk line 102 on both sides.

In block 546, in response to detecting a power supply interruption from one side of the PBU, the power controller 402 controls the SAC 404 (specifically, one SAC from the pair of SACs 404a-404b) on the same side as the direction of the power supply interruption to stop clamping. For example, in response to the detection of a single interruption that causes the PBU to stop receiving electric power at the first terminal (e.g., first serial connection at the SAC 404a) in the same direction as the interruption, the power controller 402 controls the first SAC 404a to stop clamping, and controls the second SAC 404b to continue clamping in order for the PBU to continue receiving electric power at the second terminal (e.g., second serial connection at the SAC 404b) from the uninterrupted trunk line 102 in the direction of the second shore-side power. The process 500 proceeds to block 515 to select one or more sources to meet the demanded power of the local load, in this case, based on the unavailability status of the shore-side power source or the unavailability status of the trunk line 102 on one side. A similar response results from the detection of a single interruption that causes the PBU to stop receiving electric power at the second terminal (e.g., second serial connection at the SAC 404b).

In certain embodiments, stopping clamping (blocks 544 and 546) further includes the operation of switching a return path for power received by the power transfer bus. When the trunk line 102 conducts a constant current from the first shore-side source 104a to the second shore-side source 104b, the second shore-side source 104b provides a return path for the current output from the first shore-side source 104a. As such, the SAC 404 is switched off or otherwise electrically disconnected from the sea ground electrode 422 when the trunk line 102 conducts a constant current between the first shore-side source 104a to the second shore-side source 104b, as in block 505. Also, in response to the interruption of the constant current that the PBU 400 receives from at least one of the shore-side power sources, such as the first shore-side source 104a, the series adaptive clamp 404a on the side of the interruption switches on or otherwise electrically connects to the sea ground electrode 422a in order to provide a return path for power received at the power transfer bus 406 from the uninterrupted shore-side power source, such as the second shore-side source 104b. In the case of multiple interruptions, which is when the PBU 400 selects to meet the demanded power using (iv) the auxiliary source 416 (i.e., without any shore-side power sources), both SACs 404a-404b switch to connect to the respective sea ground electrodes 422a-422b.

Although FIG. 5 illustrates a series of steps, various steps in each figure could overlap, occur in parallel, or occur any number of times.

Figure 6:
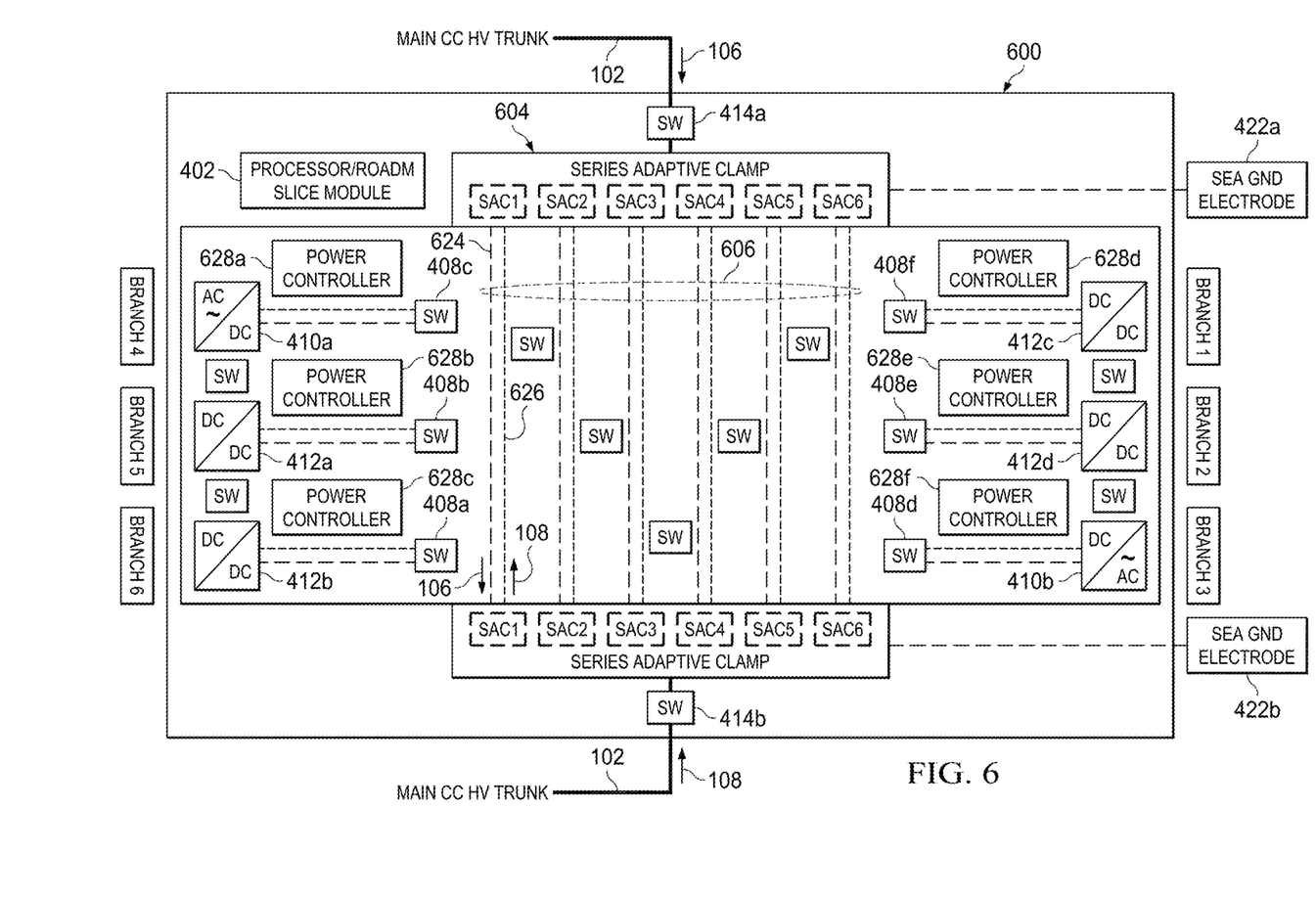
FIG. 6 illustrates an example power branching unit including a common local power transfer bus with adaptable switched voltage topology in accordance with this disclosure.

FIG. 6 illustrates an example power branching unit 600 including a common local power transfer bus 606 with adaptable switched voltage topology in accordance with this disclosure. The PBU 600 can operate in a same or similar manner as the PBU 400 of FIG. 4, and could include components 102, 408a-408f, 410a-410b, 412a-412d, 414a-414b, and 422a-422b of the PBU 400. The power transfer bus 606 operates in a similar manner as the power transfer bus 406, and includes parallel paths 624-626 similar to the parallel paths 424-426 of FIG. 4.

The PBU 600 includes a set of series adaptive clamps SAC1-SAC6 connected in series with each other, together referred to as SAC 604. For example, between the disconnect switches 414a-414b, the set of SACs could include a sequence such as SAC1, SAC2, SAC3, SAC4, SAC5, SAC6. In the set of SACs, each includes a pair of terminals including one terminal illustrated as a rectangular block connected to the sea ground electrode 422a, and the other terminal illustrated as a rectangular block connected to the sea ground electrode 422b. Two parallel paths 624 and 626 of the power transfer bus 606 extend between the pair of terminals of each of SAC1-SAC6. The SAC 604 operates analogously to a Zener diode connected in series to the trunk line 102, and operates in a similar manner as the SAC 404 of FIG. 4. For example, current may flow in the first direction 106 along the path 624 between the two terminals of $SAC1_{BLUE}$, and may flow in parallel in the second direction 108 along the path 626 between the two terminals of $SAC1_{HOT}$. Although portions $SAC1_{BLUE}$ and $SAC1_{HOT}$ of the SAC1 are shown separately, these portions can represent one series adaptive clamp.

The set of ports 408a-408f could include a set of switches that connect or disconnect the power transfer bus 406 with external devices. The ports in the set of ports 408a-408f can be respectively controlled by each power controller in a set of power controllers 628a-628f. Note that the power controller 402, which controls the operations of the set of power controllers 628a-628f, could include a reconfigurable optical add-drop multiplexer (ROADM) slice module. Also, the set of ports 408a-408f can be coupled to the lower-operating-limit PBUs of other branches (Branch 1-Branch 6), such as through electrical connections between the power converters 410a-410b and 412a-412d and the respective other branches (Branch 1-Branch 6).

Although FIG. 6 illustrates one example power branching unit 600, various changes may be made to FIG. 6. For example, the position of the set of power converters relative to the set of switches of the ports 408a-408f could be swapped.

Figure 7B:
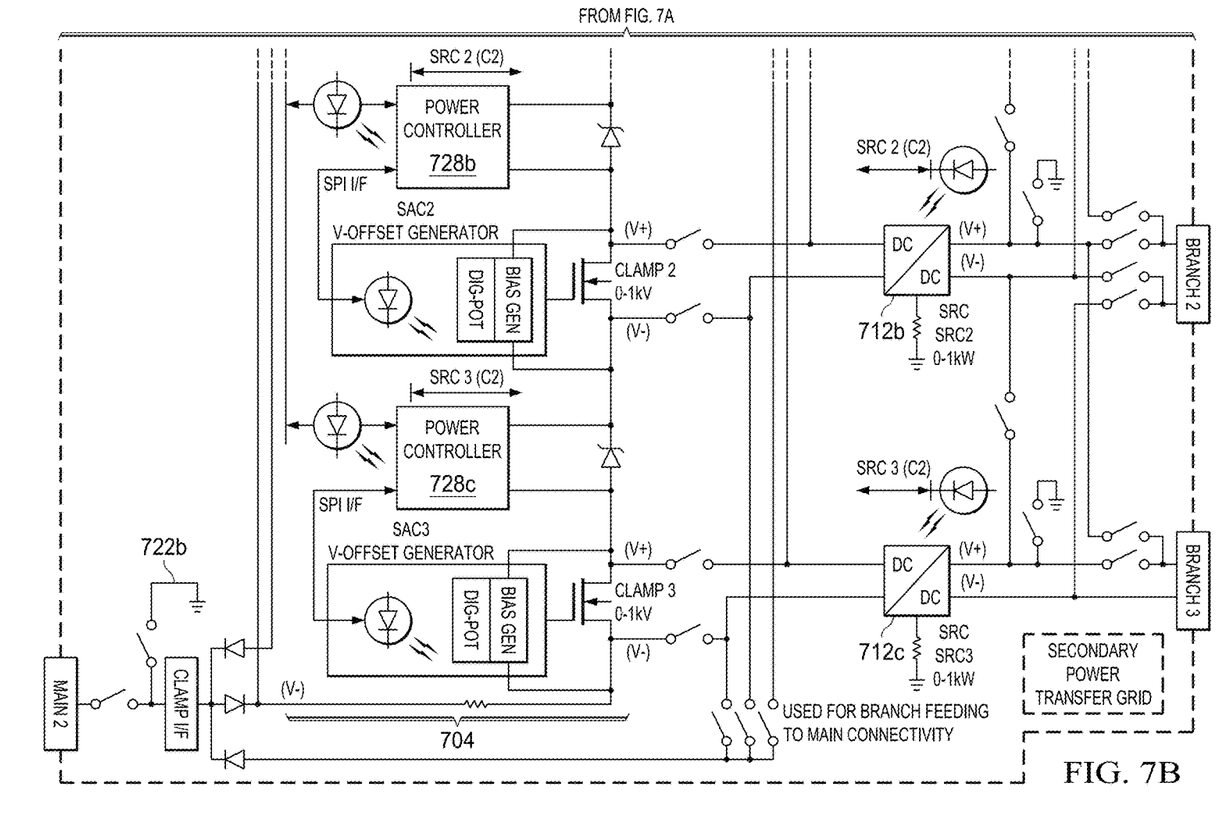

FIG. 7 illustrates a schematic of an example power branching unit 700 for a common power transfer grid in accordance with this disclosure. The PBU 700 can operate in a same or similar manner as the PBU 400 of FIG. 4 or as the PBU 600 of FIG. 6. The power controller 702, DC-to-DC/AC bidirectional series resonant power converters (SRC) 712a-712c, sea ground electrodes 722a-722b, power controllers 728a-728c of FIG. 7 could be the same as or similar to corresponding components 402, 412a-412c, 422a-422b, 628a-628c of the PBU 400 or PBU 600. The SAC 704 could be the same as the SAC 404 of FIG. 4 or the SAC 604 of FIG. 6. The SAC 704 includes a group of three 1 kV SACs connected to each other in series, including a SAC1, SAC2 and SAC3, which could be the same as or similar to SAC1-SAC3 of FIG. 6. Each of the series adaptive clamps SAC1-SAC3 includes a transistor for clamping 0-1 kV and a voltage-offset generator connected to the gate, drain, and source terminals of the transistor. The voltage-offset generator includes a bias generator, a digital port, and a diode. The SAC 704 could be used in any of the N PBUs of the mesh power grid 100 of FIG. 1, the PBU 400 of FIG. 4, or the PBU 600 of FIG. 6. As shown, the SAC 704 can be connected to sea ground electrodes 722a-722b through a clamp interface (I/F).

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed:

1. A method comprising:
   clamping, by a series adaptive clamp, a specified amount of power from a single conductor that is configured to conduct a constant current between shore-side power sources on opposite ends of the single conductor, wherein the single conductor is connected to the series adaptive clamp via a series connection; and
   providing, by the series adaptive clamp, a constant voltage to a power transfer bus at the constant current in order to supply at least some of the specified amount of power to a load connected to the power transfer bus,
   wherein the power transfer bus has two ends, the two ends including a first end connected to the series adaptive clamp and a second end connected to another series adaptive clamp, and
   wherein the power transfer bus comprises multiple parallel paths between the series adaptive clamp and the other series adaptive clamp such that the power transfer bus is connected to the series adaptive clamp and the other series adaptive clamp via a parallel connection.

2. The method of claim 1, wherein clamping the specified amount of power from the single conductor comprises:
   converting the specified amount of power between the series connection at the single conductor and the parallel connection at the first end of the power transfer bus.

3. The method of claim 1, further comprising:
   adjusting the specified amount of power according to a change of the load.

4. The method of claim 1, further comprising:
   in response to an interruption of the constant current between the series adaptive clamp and at least one of the shore-side power sources, stopping the clamping.

5. The method of claim 4, further comprising:
   in response to the interruption of the constant current between the series adaptive clamp and the at least one shore-side power source, connecting the series adaptive clamp to a sea ground electrode in order to couple the power transfer bus to the sea ground electrode to provide a return path for power received by the power transfer bus.

6. The method of claim 1, wherein the constant current is direct current.

7. The method of claim 1, wherein:
   the specified amount of power is below an operating limit of a power branching unit that includes the series adaptive clamp, and
   the load includes a second power branching unit having a lower operating limit than the operating limit of the power branching unit that includes the series adaptive clamp.

8. An apparatus comprising:
   a series adaptive clamp configured to:
   connect to a single conductor via a series connection, the single conductor configured to conduct a constant current between shore-side power sources on opposite ends of the single conductor;
   clamp a specified amount of power from the single conductor;
   connect to one end of two ends of a power transfer bus via a parallel connection, wherein the other end of the power transfer bus is connected to another series adaptive clamp, wherein the power transfer bus comprises multiple parallel paths between the series adaptive clamp and the other series adaptive clamp; and
   provide a constant voltage to the power transfer bus at the constant current in order to supply at least some of the specified amount of power to a load connected to the power transfer bus.

9. The apparatus of claim 8, wherein the series adaptive clamp is further configured to:
   convert the specified amount of power between the series connection and the parallel connection.

10. The apparatus of claim 8, wherein the series adaptive clamp is further configured to clamp the specified amount of power from the single conductor by adjusting the specified amount of power according to a change of the load.

11. The apparatus of claim 8, further comprising:
    a power controller configured to control the series adaptive clamp to:
    in response to an interruption of the constant current between the series adaptive clamp and at least one of the shore-side power sources, stop the clamping.

12. The apparatus of claim 11, wherein the power controller is further configured to control the series adaptive clamp to:
    in response to the interruption of the constant current between the series adaptive clamp and the at least one shore-side power source, connect to a sea ground electrode in order to couple the power transfer bus to the sea ground electrode to provide a return path for power received by the power transfer bus.

13. The apparatus of claim 8, wherein the constant current is direct current.

14. The apparatus of claim 8, further comprising:
    at least one port configured to couple to an external device, receive power from the external device when the external device is an auxiliary source, and supply the at least some of the specified amount of power to the load when the external device is the load,
    wherein the specified amount of power is below an operating limit of a power branching unit that includes the series adaptive clamp, and
    wherein the load includes a second power branching unit having a lower operating limit than the operating limit of the power branching unit that includes the series adaptive clamp.

15. A system comprising:
    at least one pair of series adaptive clamps (SACs), each SAC configured to:
    connect to a single conductor via a series connection, the single conductor configured to conduct a constant current between shore-side power sources on opposite ends of the single conductor;
    clamp a specified amount of power from the single conductor;

connect to one end of two ends of a power transfer bus via a parallel connection, wherein the other end of the power transfer bus is connected to another SAC of a same pair of SACs, wherein the power transfer bus comprises multiple parallel paths between the SAC and the other SAC of the same pair of SACs; and provide a constant voltage to the power transfer bus at the constant current in order to supply at least some of the specified amount of power to a load connected to the power transfer bus.

16. The system of claim 15, further comprising:

a number N of power branching units (PBU), each PBU including:

first and second SACs of the same pair of SACs from among the at least one pair of SACs, the first SAC configured to connect to the single conductor via a first series connection and connect to the one end of the power transfer bus via a first parallel connection, the second SAC configured to connect to the single conductor via a second series connection and connect to the other end of the power transfer bus via a second parallel connection; and a power controller configured to control each of the first and second SACs to specify the specified amount of power and adjust the specified amount of power according to a change of the load.

17. The system of claim 16, wherein the power controller is further configured to control each of the first and second SACs to:

in response to an interruption of the constant current between the series adaptive clamp and at least one of the shore-side power sources, stop the clamping.

18. The system of claim 17, wherein the power controller is further configured to control each of the first and second SACs to:

in response to the interruption of the constant current between the series adaptive clamp and the at least one of the shore-side power sources, connect to a sea ground electrode in order to couple the power transfer bus to the sea ground electrode to provide a return path for power received by the power transfer bus.

19. The system of claim 16, wherein each PBU further comprises at least one port configured to:

couple to an external device, receive power from the external device when the external device is an auxiliary source, and supply the at least some of the specified amount of power to the load when the external device is the load, wherein the specified amount of power is below an operating limit of the PBU, and wherein the load includes another PBU having a lower operating limit than the operating limit of the PBU.

20. The system of claim 15, wherein the constant current is direct current.

* * * * *